United States Patent
Mlinar et al.

(10) Patent No.: US 10,609,361 B2
(45) Date of Patent: Mar. 31, 2020

(54) IMAGING SYSTEMS WITH DEPTH DETECTION

(71) Applicant: SEMICONDUCTOR COMPONENTS INDUSTRIES, LLC, Phoenix, AZ (US)

(72) Inventors: Marko Mlinar, Horjul (SI); Ulrich Boettiger, Garden City, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/023,077

(22) Filed: Jun. 29, 2018

(65) Prior Publication Data

US 2020/0007853 A1    Jan. 2, 2020

(51) Int. Cl.
| | |
|---|---|
| *H04N 5/33* | (2006.01) |
| *H04N 13/271* | (2018.01) |
| *H04N 9/04* | (2006.01) |
| *G06T 7/521* | (2017.01) |

(52) U.S. Cl.
CPC .......... *H04N 13/271* (2018.05); *G06T 7/521* (2017.01); *H04N 5/332* (2013.01); *H04N 9/04553* (2018.08); *G06T 2207/10048* (2013.01)

(58) Field of Classification Search
CPC .. H04N 13/271; H04N 5/332; H04N 9/04553; G06T 7/521; G06T 2207/10048
USPC ........................................................ 348/139
See application file for complete search history.

(56) References Cited

U.S. PATENT DOCUMENTS

| | | | |
|---|---|---|---|
| 8,971,612 B2* | 3/2015 | Shotton ................ | G06K 9/6255 382/159 |
| 9,070,902 B2* | 6/2015 | Verschuren ......... | H01L 51/5271 |
| 2011/0227117 A1* | 9/2011 | Verschuren ......... | H01L 51/5271 257/98 |
| 2013/0156297 A1* | 6/2013 | Shotton ................ | G06K 9/6255 382/159 |
| 2013/0226509 A1 | 8/2013 | Boufounos | |
| 2014/0240492 A1 | 8/2014 | Lee | |
| 2015/0116692 A1* | 4/2015 | Zuk ....................... | G01S 7/4817 356/4.01 |
| 2015/0377953 A1* | 12/2015 | Nakamura ......... | G01R 31/2656 324/97 |
| 2016/0050407 A1* | 2/2016 | Chen ................... | H04N 5/23212 348/47 |
| 2016/0165108 A1* | 6/2016 | Jang ..................... | H04N 5/2254 348/374 |
| 2017/0168265 A1* | 6/2017 | Du ......................... | G02B 7/102 |

(Continued)

*Primary Examiner* — Shan E Elahi
(74) *Attorney, Agent, or Firm* — Treyz Law Group, P.C.; Joseph F. Guihan

(57) ABSTRACT

An imaging system may include an image sensor, a lens, and layers with reflective properties, such as an infrared cut-off filter, between the lens and the image sensor. The lens may focus light from an object in a scene onto the image sensor. Some of the light directed onto the image sensor may form a first image on the image sensor. Other portions of the light directed onto the image sensor may reflect off of the image sensor and back towards the layers with reflective properties. These layers may reflect the light back onto the image sensor, forming a second image that is shifted relative to the first image. Depth mapping circuitry may compare the first and second images to determine the distance between the imaging system and the object in the scene.

16 Claims, 13 Drawing Sheets

(56) References Cited

U.S. PATENT DOCUMENTS

| | | |
|---|---|---|
| 2017/0196451 A1 | 7/2017 | Tian |
| 2017/0230598 A1* | 8/2017 | Takayanagi ......... H01L 27/1469 |
| 2017/0230638 A1* | 8/2017 | Wajs ....................... G06T 7/571 |
| 2017/0318407 A1* | 11/2017 | Meister .................... H04S 7/303 |
| 2018/0000359 A1* | 1/2018 | Watanabe ............... A61B 5/021 |
| 2018/0131923 A1* | 5/2018 | Chang ..................... H04N 5/332 |
| 2018/0270462 A1* | 9/2018 | Otsubo ............. H01L 27/14645 |
| 2018/0293744 A1* | 10/2018 | Yu ............................ G06T 7/80 |

* cited by examiner

IMAGING SYSTEMS WITH DEPTH DETECTION

BACKGROUND

This application relates to imaging systems, and more particularly, imaging systems with depth detection capabilities.

Imaging systems are commonly used in electronic devices such as cellular telephones, cameras, and computers to capture images. In a typical arrangement, an electronic device is provided with an array of image pixels arranged in pixel rows and pixel columns. The image pixels contain a photodiode for generating charge in response to light. Circuitry is commonly coupled to each pixel column for reading out image signals from the image pixels. A color filter element typically covers each photodiode.

In some applications, it may be desirable to determine the distance between the imaging system and an object in a scene that the imaging system is capturing as an image. Conventional systems typically use a sensor separate from the array of image pixels to make depth measurements of this type, or may require a separate light source to illuminate the scene while measuring the reflected light for depth sensing. These arrangements, however, require implementing additional hardware into the imaging system and can result in increases in the size and power consumption of the imaging system.

It would therefore be desirable to provide imaging systems with improved depth detection capabilities.

DETAILED DESCRIPTION

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
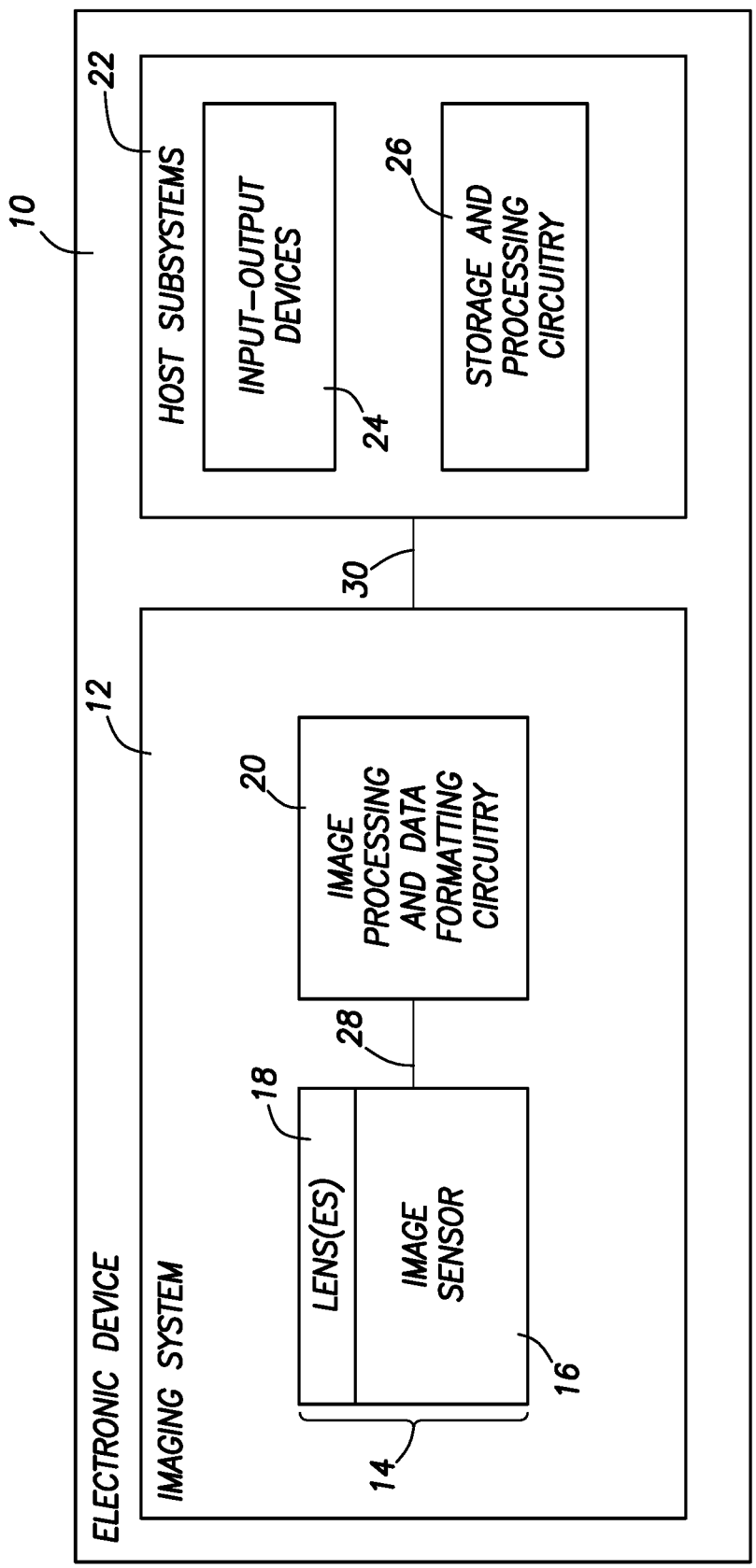
FIG. 1 is a diagram of an illustrative electronic device having an image sensor in accordance with an embodiment.

FIG. 1 is a diagram of an illustrative imaging and response system including an imaging system that uses an image sensor to capture images. Electronic device 10 of FIG. 1 may an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, electronic device 10 may include an imaging system such as imaging system 12 and host subsystems such as host subsystem 22. Imaging system 12 may include camera module 14. Camera module 14 may include one or more image sensors 16 and one or more lenses 18.

Each image sensor in camera module 14 may be identical or there may be different types of image sensors in a given image sensor array integrated circuit. During image capture operations, each lens 18 may focus light onto an associated image sensor 16. Image sensor 16 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from image sensor 16 may be provided to image processing and data formatting circuitry 20 via path 28. Image processing and data formatting circuitry 20 may be used to perform image processing functions such as data formatting, adjusting white balance and exposure, implementing video image stabilization, face detection, etc. Image processing and data formatting circuitry 20 may also be used to compress raw camera image files if desired (e.g., to Joint Photographic Experts Group or JPEG format). In some arrangements, which are sometimes referred to as a system on chip (SOC) arrangement, image sensor 16 and image processing and data formatting circuitry 20 are implemented on a common semiconductor substrate (e.g., a common silicon image sensor integrated circuit die). If desired, image sensor 16 and image processing circuitry 20 may be formed on separate semiconductor substrates. For example, image sensor 16 and image processing circuitry 20 may be formed on separate substrates that have been stacked.

Imaging system 12 (e.g., image processing and data formatting circuitry 20) may convey acquired image data to host subsystem 22 over path 30. Host subsystem 22 may include processing software for detecting objects in images, detecting motion of objects between image frames, determining distances to objects in images, filtering, or otherwise processing images provided by imaging system 12.

If desired, electronic device 10 may provide a user with numerous high-level functions. In a computer or advanced cellular telephone, for example, a user may be provided with the ability to run user applications. To implement these functions, host subsystem 22 of device 10 may have input-output devices 24 such as keypads, input-output ports, joysticks, and displays, and storage and processing circuitry 26. Storage and processing circuitry 26 may include volatile and nonvolatile memory (e.g., random-access memory, flash memory, hard drives, solid-state drives, etc.). Storage and processing circuitry 26 may also include microprocessors, microcontrollers, digital signal processors, application specific integrated circuits, etc.

Figure 2:
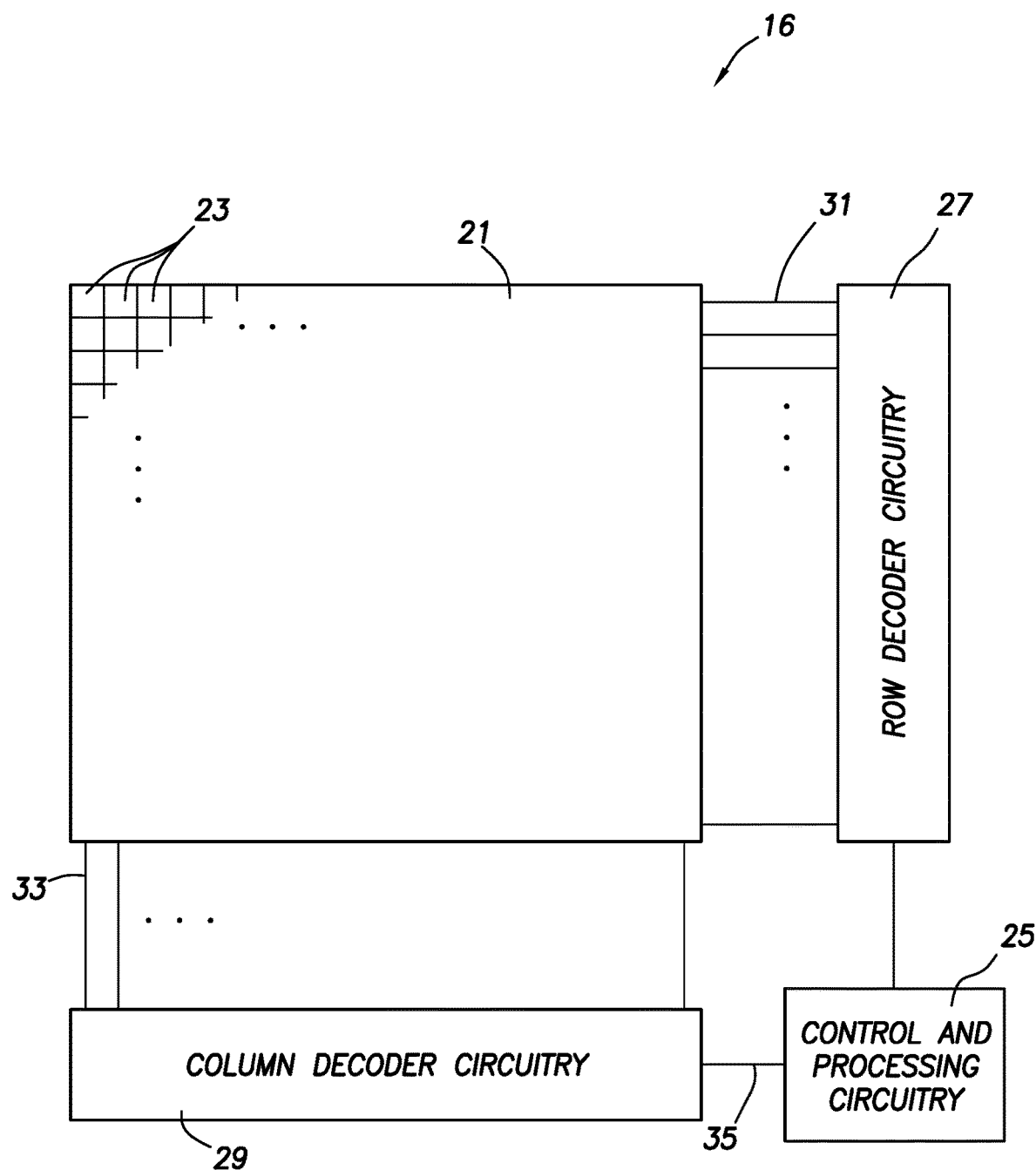
FIG. 2 is a diagram of an illustrative pixel array and associated readout circuitry in accordance with an embodiment.

As shown in FIG. 2, image sensor 16 may include a pixel array 21 containing pixels 23 arranged in rows and columns and control and processing circuitry 25 (which may include, for example, image signal processing circuitry). Array 21 may contain, for example, hundreds or thousands of rows and columns of pixels 23. Control circuitry 25 may be coupled to row control circuitry 27 and image readout circuitry 29 (sometimes referred to as column control circuitry, readout circuitry, processing circuitry, or column decoder circuitry). Row control circuitry 27 may receive row addresses from control circuitry 25 and supply corresponding row control signals such as reset, row-select, charge transfer, dual conversion gain, and readout control signals to pixels 23 over row control paths 31. One or more conductive lines such as column lines 33 may be coupled to each column of pixels 23 in array 21. Column lines 33 may be used for reading out image signals from pixels 23 and for supplying bias signals (e.g., bias currents or bias voltages) to pixels 23. If desired, during pixel readout operations, a pixel row in array 21 may be selected using row control circuitry 27 and image signals generated by image pixels 23 in that pixel row can be read out along column lines 33.

Image readout circuitry 29 may receive image signals (e.g., analog pixel values generated by pixels 23) over column lines 33. Image readout circuitry 29 may include sample-and-hold circuitry for sampling and temporarily storing image signals read out from array 21, amplifier circuitry, analog-to-digital conversion (ADC) circuitry, bias circuitry, column memory, latch circuitry for selectively enabling or disabling the column circuitry, or other circuitry that is coupled to one or more columns of pixels in array 21 for operating pixels 23 and for reading out image signals from pixels 23. ADC circuitry in readout circuitry 29 may convert analog pixel values received from array 21 into corresponding digital pixel values (sometimes referred to as digital image data or digital pixel data). Image readout circuitry 29 may supply digital pixel data to control and processing circuitry 25 and/or processor 20 (FIG. 1) over path 35 for pixels in one or more pixel columns.

If desired, a color filter array may be formed over photosensitive regions in array 21 so that a desired color filter element in the color filter array is formed over an upper surface of the photosensitive region of an associated pixel 23. A microlens may be formed over an upper surface of the color filter array to focus incoming light onto the photosensitive region associated with that pixel 23. Incoming light may be focused onto the photosensitive region by the microlens and may pass through the color filter element so that only light of a corresponding color is captured at the photosensitive region.

If desired, pixels 23 in array 21 of FIG. 2 may be provided with an array of color filter elements that each pass one or more colors of light. All or some of pixels 23 may be provided with a color filter element. Color filter elements for pixels 23 may be red color filter elements (e.g., photoresist material or interference/dichroic/thin-film filter material that passes red light while reflecting and/or absorbing other colors of light), blue color filter elements (e.g., photoresist material that passes blue light while reflecting and/or absorbing other colors of light), and/or green color filter elements (e.g., photoresist material that passes green light while reflecting and/or absorbing other colors of light). Color filter elements may also be configured to filter light that is outside the visible human spectrum. For example, color filter elements may be configured to filter ultraviolet or infrared light (e.g., a color filter element may only allow infrared light or ultraviolet light to reach the photodiode). Color filter elements may configure image pixel 23 to only detect light of a certain wavelength or range of wavelengths (sometimes referred to herein as a wavelength band) and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Magenta color filter elements that are configured to pass red and blue light may be also be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels. Image signals generated by broadband image pixels may sometimes be referred to herein as broadband image signals. Broadband image pixels may have a natural sensitivity defined by the material that forms the broadband color filter element and/or the material that forms the image sensor pixel (e.g., silicon). In another suitable arrangement, broadband image pixels may be formed without any color filter elements. The sensitivity of broadband image pixels may, if desired, be adjusted for better color reproduction and/or noise characteristics through use of light absorbers such as pigments. In contrast, "colored" pixel may be used herein to refer to image pixels that are primarily sensitive to one color of light (e.g., red light, blue light, green light, or light of any other suitable color). Colored pixels may sometimes be referred to herein as narrowband image pixels because the colored pixels have a narrower spectral response than the broadband image pixels.

If desired, narrowband pixels and/or broadband pixels that are not configured to be sensitive to infrared light may be provided with color filters incorporating absorbers of NIR radiation. Color filters that block near-infrared light may minimize the impact of infrared light on color reproduction in illuminants containing both visible and infrared radiation.

As an example, image sensor pixels such as the image pixels in array 21 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements. In another suitable example, a monochrome image sensor 16 may be provided by providing all of the pixels 23 in array 21 with clear material (e.g., material that passes at least red, blue, and green light) instead of color filters that block some wavelengths while passing others. These examples are merely illustrative and, in general, color filter elements of any desired color and in any desired pattern may be formed over any desired number of image pixels 23.

Figure 3:
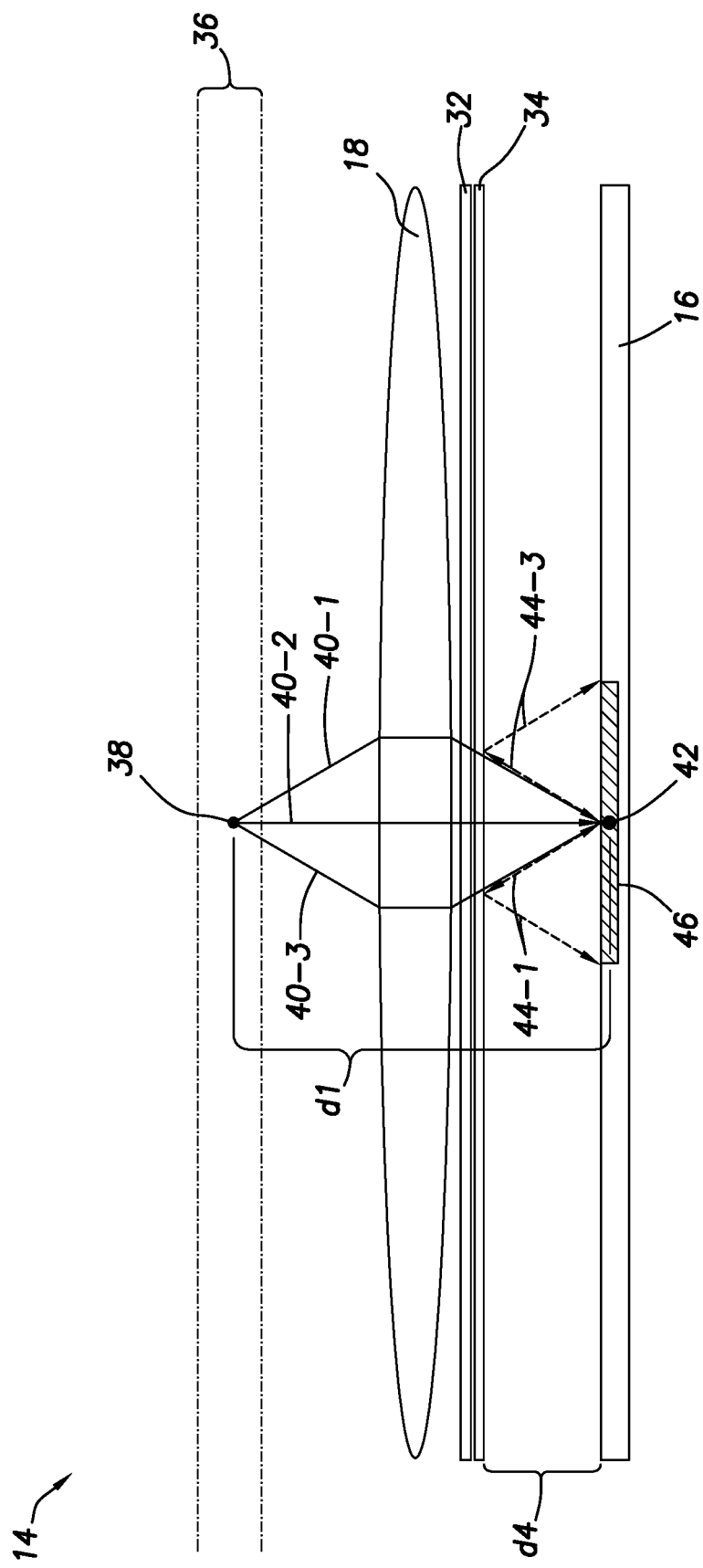
FIG. 3 is a cross-sectional side view of an illustrative camera module capturing an image of an object in a scene in accordance with an embodiment.

A cross-sectional side view of an illustrative camera module 14 is shown in FIG. 3. As shown in FIG. 3, camera module 14 includes a lens 18 that focuses light onto image sensor 16. Camera module 14 may include interface layer 34 (sometimes referred to herein as an intermediate layer or glass layer) between image sensor 16 and lens 18. Interface layer 34 may be a layer of glass, plastic, or other transparent material. In arrangements in which interface layer 34 is glass, interface layer 34 may have a reflectance of about 4%. In general, interface layer 34 may be at least partially reflective. If desired, interface layer may be treated with an anti-reflection coating to help to reduce internal reflections within camera module 14, such as reflections between image sensor 16 and lens 18. The anti-reflective properties of the anti-reflection coating may be adjusted (e.g., selected during manufacturing of camera module 14) to reflect different amounts of light. For example, the anti-reflection coating may block all reflections, may block 99% of reflections, may block between 90% and 99% of reflections, may block between 50% of reflections and 90% of reflections, or may be configured to have other anti-reflective properties. This, however, is merely illustrative. In some arrangements, interface layer 34 may not have an anti-reflective coating, or may be omitted entirely.

Camera module 14 may also include an infrared cut-off filter 32 between image sensor 16 and lens 18. Infrared cut-off filter 32 may block infrared light that passes through lens 18 from reaching image sensor 16. In this way, infrared light from the scene that is being imaged may be blocked from reaching image sensor 16 and from creating undesirable visual artifacts in the image generated by image sensor 16. If desired, infrared cut-off filter 32 may block all wavelengths in the infrared spectrum (e.g., 700 nm to 1,000 nm), may be a dual-band cut-off filter that blocks only selected wavelength bands in the infrared spectrum (e.g., 700 nm to 800 nm and 900 nm to 1,000 nm) while allowing other wavelength bands to pass, may block all but a specific wavelength (e.g., all but 850 nm infrared light), or may be another suitable type of infrared cut-off filter.

Camera module 14 may have a depth of field 36. Depth of field 36 may represent the distance between the nearest and farthest objects in a scene that are in focus in an image captured by camera module 14. The depth of field 36 of a given camera module 14 may depend on the focal length of lens 18, the aperture size of the camera module, and other characteristics of camera module 14 that may be adjusted to change the depth-of-field 36. Thus, the depth of field 36 shown in FIG. 3 is merely illustrative. Depth of field 36 may be adjusted such that substantially all objects in a scene are in focus (e.g., a relatively large depth of field) or may be adjusted such that only objects in a small range of distances from camera module 14 are in focus (e.g., a relatively small depth of field).

In FIG. 3, an illustrative object 38 in the scene being captured by camera module 14 is located at a distance d1 from image sensor 16. Object 38 is aligned with the optical axis of camera module 14. As shown in FIG. 3, light rays 40-1, 40-2, and 40-3 originate at object 38 (e.g., as environmental light that reflects off of object 38). Light rays 40-1, 40-2, and 40-3 (sometimes referred to herein as primary rays) pass through lens 18 and are focused onto image sensor 16 as primary image 42. Because object 38 is within the depth of field of camera module 14, primary image 42 is in-focus.

Image sensor 16 may include reflective structures such as conductive traces, metal interconnect layers, redistribution layers, and microlenses that cause a portion of the light rays 40-1, 40-2, and/or 40-3 (e.g., 1%, 2% 5-10%, 20%, 50%, or another suitable portion of the light directly incident on sensor 16) to reflect off of image sensor 16. In the illustrative example of FIG. 3, a first portion of light 40-1 is reflected off of sensor 16 as reflected ray 44-1, and a second portion of light 40-3 is reflected off of sensor 16 as reflected ray 44-3 (sometimes referred to herein as a secondary ray). Reflected rays 44-1 and 44-3 are reflected towards at least partially reflective structures such as infrared cut-off filter 32 and/or interface layer 34, which reflect reflected rays 44-1 and 44-3 back towards image sensor 16. Upon reaching image sensor 16 once again, reflected rays 44-1 and 44-3 may from a secondary image 46 on sensor 16. Depending on the amount of the light from rays 40-1, 40-2, and 40-3 that initially reflected off of image sensor 16, secondary image 46 may be faint compared to primary image 42, and may not be noticed by a human user viewing the image.

Although not shown in the example of FIG. 3, a portion of ray 40-2 that is directly incident on image sensor 16 may reflect off of image sensor 16. Because ray 40-1 is aligned with the optical axis of camera module 14, however, the reflected light would once again be incident at the location of primary image 42, rather than defining a boundary of secondary image 46.

Figure 4:
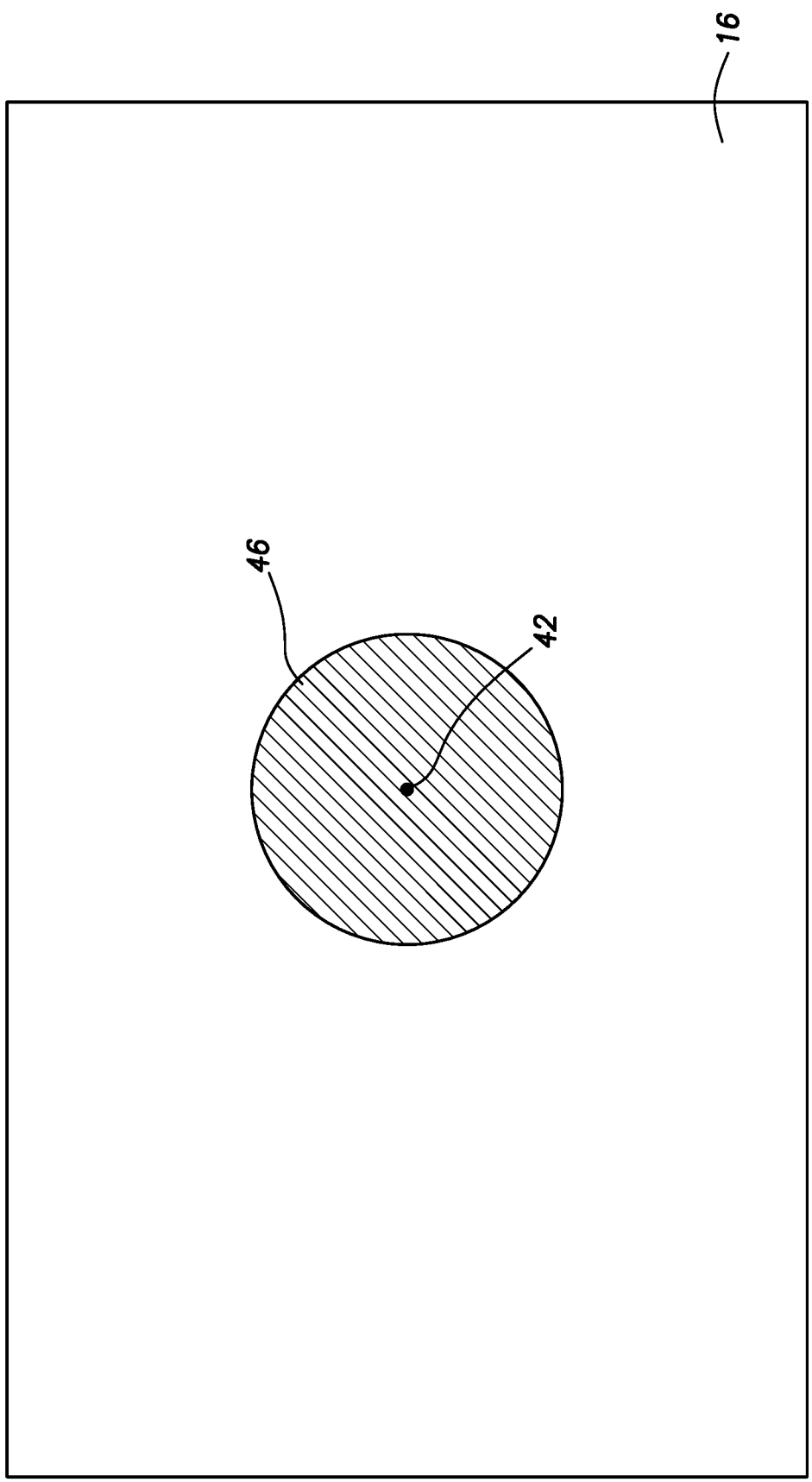
FIG. 4 is a top-down view of the image sensor and captured image of FIG. 3 in accordance with an embodiment.

A top-down view of primary image 42 and secondary image 46 on image sensor 16 are shown in FIG. 4. Because the rays 40-1 and 40-3 are not aligned with the optical axis of camera module 14 (i.e., the rays are off-axis), the reflected rays 44-1 and 44-3 spread out and cause secondary image 46 to be out of focus.

Figure 5:
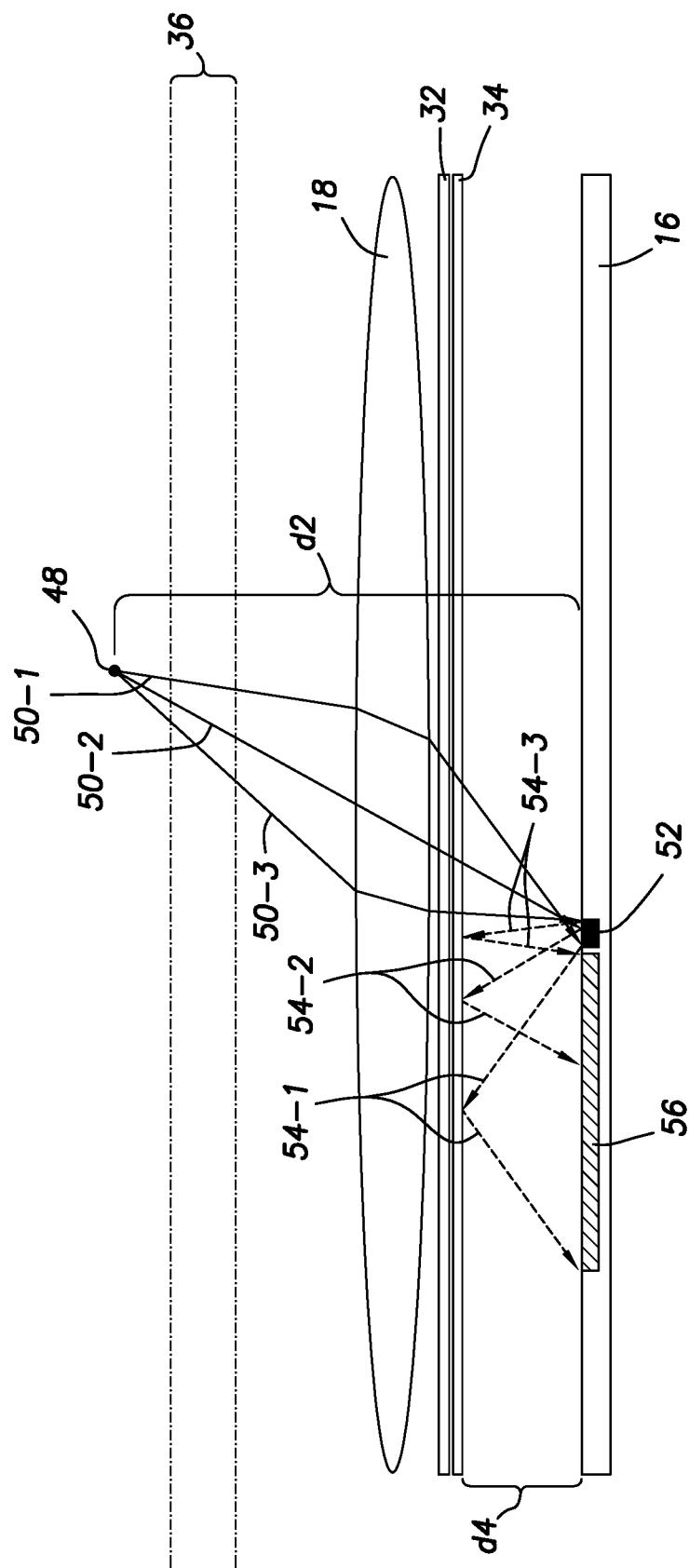
FIG. 5 is a cross-sectional side view of an illustrative camera module capturing an image of an object in a scene in accordance with an embodiment.

A cross-sectional side view of camera module 14 capturing an image of an object 48 at a distance d2 (which is greater than distance d1) from image sensor 16 is shown in FIG. 5. In FIG. 5, object 48 is not aligned with the optical axis of camera module 14, so all of light rays 50-1, 50-2, and 50-3 are all off-axis with respect to the optical axis of camera module 14. As light rays 50-1, 50-2, and 50-3 pass through lens 18, lens 18 at least partially focuses the light rays onto image sensor 16 to form primary image 52. Because object 48 is outside the depth of field 36 of camera module 14, however, the primary image 52 is out of focus. Out-of-focus primary image 52 may be referred to as a blur spot, primary blur spot, or first blur spot. Blur spot 52 may have a first size.

Due to the presence of reflective structures in image sensor 16 (e.g., as described above in connection with FIG. 3), a portion of light rays 50-1, 50-2, and 50-3 may be reflected off of sensor 16 as reflected rays 54-1, 54-2, and 54-3, respectively. These rays reflect back up towards at least partially reflective structures 32 and 34. Infrared cut-off filter 32 (and/or at least partially reflective interface layer 34) may reflect these reflected rays back onto image sensor 16 to form secondary image 56. Because the reflected rays 54-1, 54-2, and 54-3 are off-axis and spread out as they are reflected within camera module 14, secondary image is even more out of focus (i.e., blurred) than primary image 52. Secondary image 56 may be referred to as a blur spot, secondary blur spot, second blur spot, or reflected blur spot. Blur spot 56 may have a second size that is greater than the size of first blur spot 52.

Figure 6:
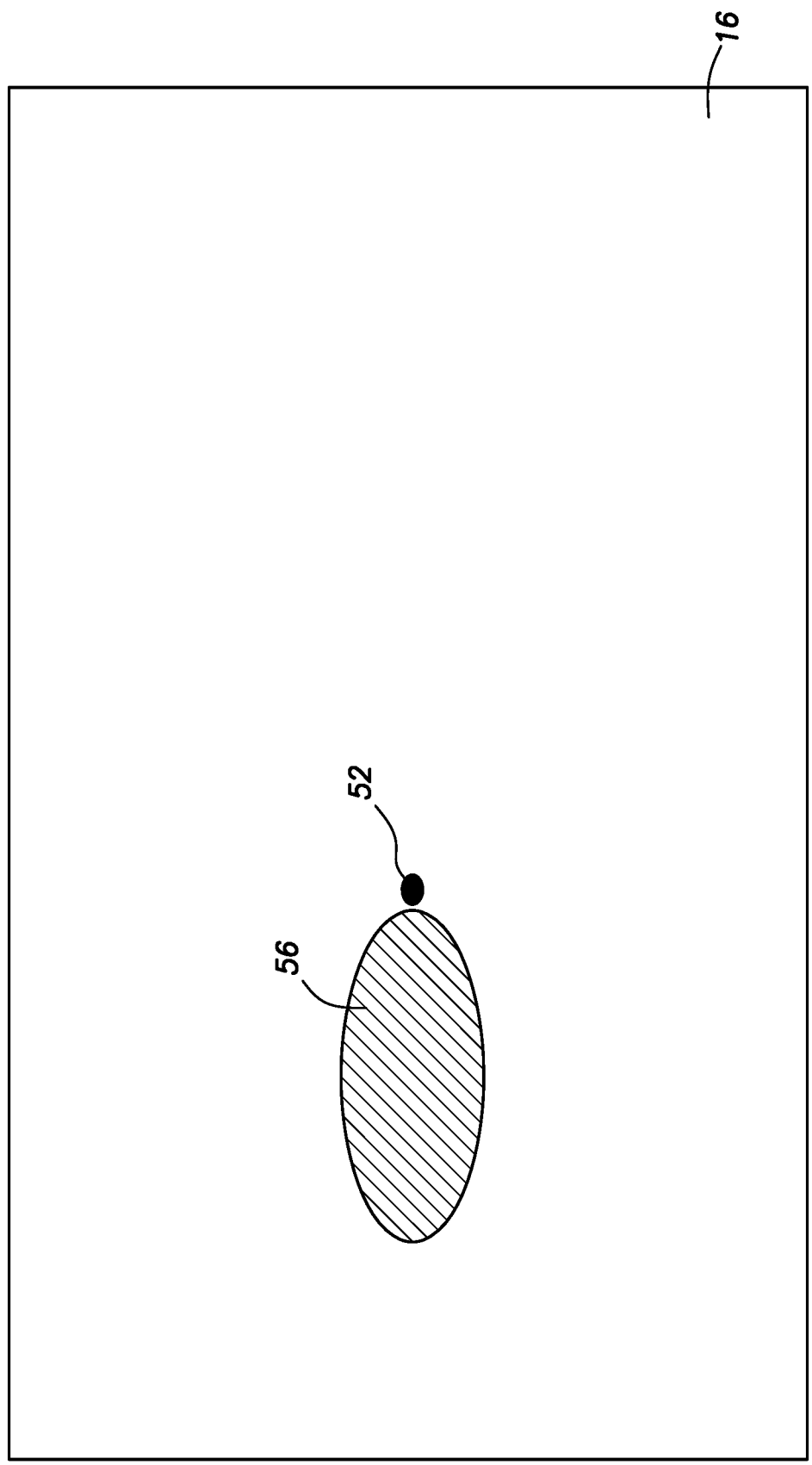
FIG. 6 is a top-down view of the image sensor and captured image of FIG. 5 in accordance with an embodiment.

A top-down view of primary image 52 and secondary image 56 on image sensor 16 are shown in FIG. 6. As shown in FIG. 6, secondary image 56 is larger and more out of focus (i.e., more blurred) than primary image 52.

Based on the differences in the size, location on sensor 16, and relative focus between primary image 52 and secondary image 56, electronic device 10 (e.g., image processing circuitry 20 and/or storage and processing circuitry 26) may be able to perform depth sensing operations to determine the distance d2 between object 48 and image sensor 16. Depth sensing operations may be based on a combination of a comparison of primary image 52 and secondary image 56, as well as known characteristics of camera module 14. Known information regarding camera module 14 may include the distance d4 between image sensor 16 and at least partially reflective layers 32 and 34, the focal length of lens 18, and the chief ray angle at which primary rays 50-1, 50-2, and 50-3 are incident upon sensor 16. Based on these known characteristics, depth sensing operations may be able to determine that a primary image 52 and a secondary image 56 on sensor 16 must be the result of incident light originating from an object at a certain distance from sensor 16 (e.g., a distance of d2).

Figure 7:
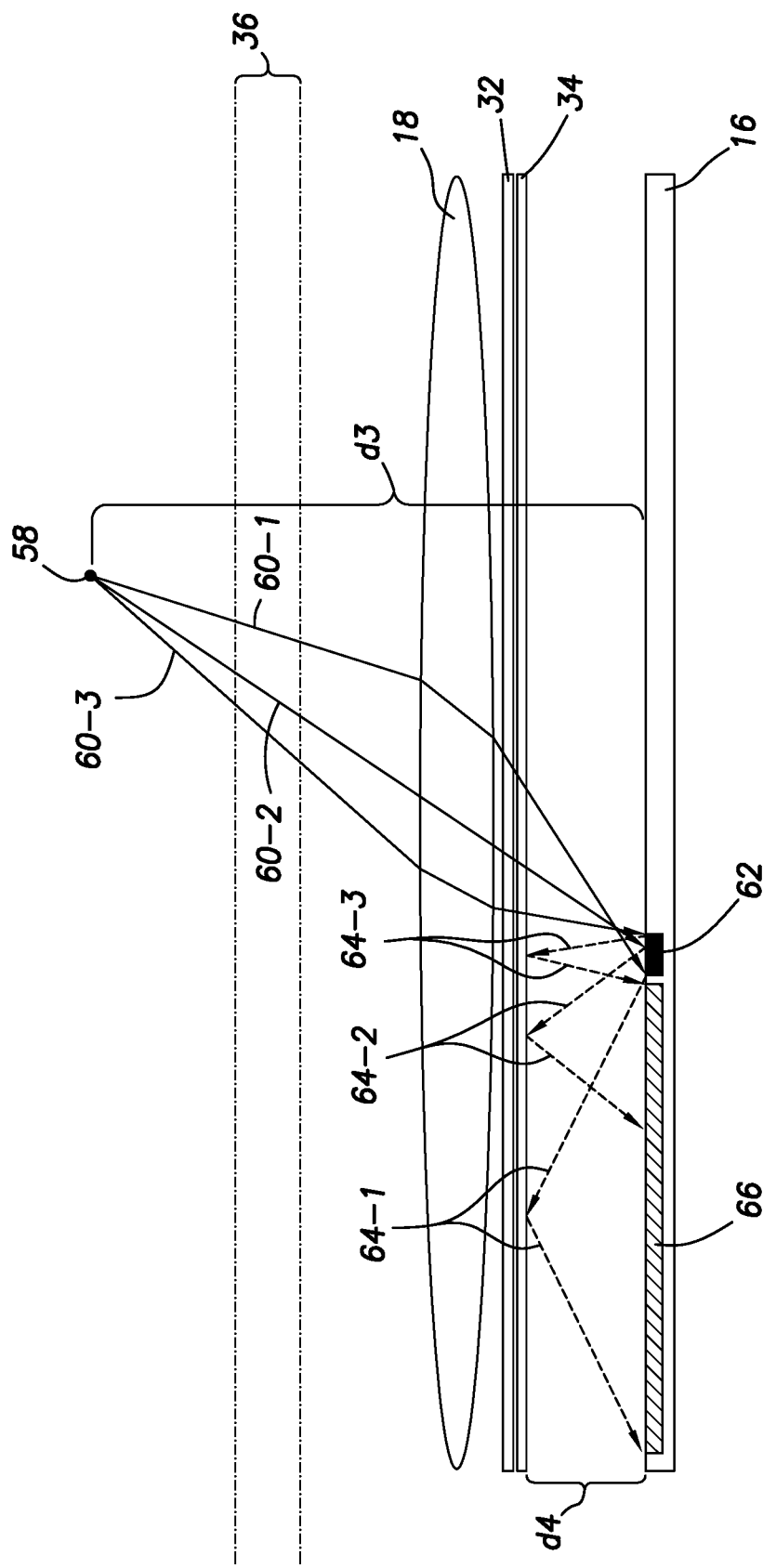
FIG. 7 is a cross-sectional side view of an illustrative camera module capturing an image of an object in a scene in accordance with an embodiment.

A cross-sectional side view of camera module 14 capturing an image of an object 58 at a distance d3 (which is greater than distances d1 and d2) from image sensor 16 is shown in FIG. 7. In FIG. 7, object 58 is not aligned with the optical axis of camera module 14, so all light rays 60-1, 60-2, and 60-3 are all off-axis with respect to the optical axis of camera module 14. As light rays 60-1, 60-2, and 60-3 pass through lens 18, lens 18 at least partially focuses the light rays onto image sensor 16 to form primary image 62. Because object 58 is outside the depth of field 36 of camera module 14 (e.g., even further outside the depth of field than object 48 in FIG. 5), however, the primary image 62 is out of focus (e.g., even more out of focus than primary image 52 in FIG. 5). Because distance d3 is greater than distance d2 (e.g., object 58 is even further outside the depth of field 36 than object 48 in FIG. 5), primary image 62 may be even more out of focus than primary image 52 in FIG. 5. Out-of-focus primary image 62 may be referred to as a blur spot, primary blur spot, or first blur spot. Blur spot 62 may have a first size.

Due to the presence of reflective structures in image sensor 16 (as described above in connection with FIG. 3), a portion of light rays 60-1, 60-2, and 60-3 may be reflected off of sensor 16 as reflected rays 64-1, 64-2, and 64-3 respectively. These rays reflect back up towards at least partially reflective structures 32 and 34. Infrared cut-off filter 32 (and/or at least partially reflective interface layer 34) may reflect reflected rays back onto image sensor 16 to form secondary image 66. Because the reflected rays 64-1, 64-2, and 64-3 are off-axis and spread out as they are reflected within camera module 14, secondary image is even more out of focus (i.e., blurred) than primary image 62. Because distance d3 is greater than distance d2 (e.g., object 58 is even further outside the depth of field 36 than object 48 in FIG. 5), reflected rays 64-1, 64-2, and 64-3 may reflect off of image sensor 16 at greater angles and spread out more within camera module 14 than reflected rays 54-1, 54-2, and 54-3. In this way, secondary image 66 may be even more out of focus than secondary image 56 in FIG. 5. Secondary image 66 may be referred to as a blur spot, secondary blur spot, second blur spot, or reflected blur spot. Blur spot 66 may have a second size that is greater than the size of first blur spot 62.

Figure 8:
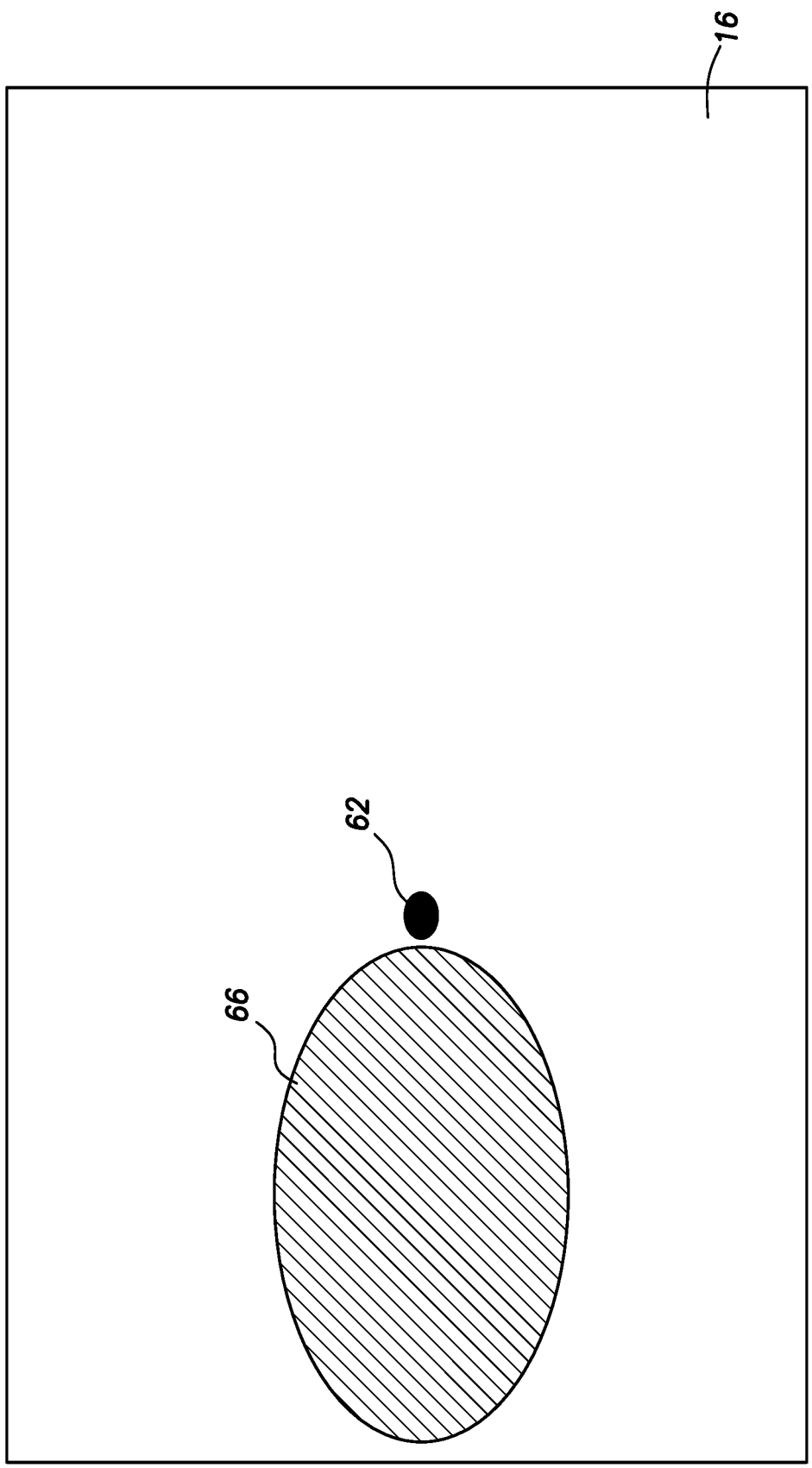
FIG. 8 is a top-down view of the image sensor and captured image of FIG. 7 in accordance with an embodiment.

A top-down view of primary image 62 and secondary image 66 on image sensor 16 are shown in FIG. 8. As shown in FIG. 8, secondary image 66 is larger and more out of focus (i.e., more blurred) than primary image 62. When compared to FIG. 6, it can be seen that primary image 62 is larger and more out of focus (i.e., more blurred) than primary image 52, and secondary image 66 is larger and more out of focus (i.e., more blurred) than secondary image 56. This, however, is merely illustrative. The relative sizes, shapes, and levels of focus between primary and secondary blur spots may vary depending on the location of the object in the scene, the distance between the object and camera module 14, characteristics of camera module 14, and other factors.

In the illustrative examples of FIGS. 5-8, objects 48 and 58 are too far from camera module 14 to be within depth of field 36. Lens 18 actually focuses the image of objects 48 and 58 at a location in front of the surface of sensor 16. Accordingly, the primary image is at least partially out-of-focus, and the secondary image is generally larger and more out-of-focus than the primary image. This, however, is merely illustrative. In some scenarios, an object may be too close to camera module 14 to be within depth of field 36. In this scenario, lens 18 may focus the image behind the surface of image sensor 16. Accordingly, the primary image is at least partially out-of-focus. As the reflected rays of light reflect between sensor 16 and at least partially reflective layers 32 and 34, however, the reflected rays may converge such that the secondary image is smaller and more in-focus that the primary image. By comparing the size, shape, and relative degrees of focus (e.g., which image is more focused, and to what degree) of the primary and secondary images, the distance between image sensor 16 and the object may be determined. Depth sensing operations of this type may be performed whether the object is too close to camera module 14 to be within depth of field 36, or too far from camera module 14 to be in focus.

The reflection of light within camera module 14 may also be modulated based on the distance d4 between the image sensor 16 and at least partially reflective layer 32 and/or 34. In general, the wider the gap (i.e., distance d4) between sensor 16 and at least partially reflective layers 32/34, the more the primary light rays and reflected light rays will spread out before reaching sensor 16, and the more out of focus (i.e., blurred) the primary image and secondary image will be. In one illustrative embodiment, distance d4 may be determined during the design and/or manufacturing of camera module 14 and may be a fixed distance. This fixed distance may be determined (based on other known characteristics of camera module 14, such as the focal length of lens 18, the chief ray angle of light incident upon sensor 16, and/or the reflectivity of sensor 16 and/or layers 32 and 34, for example) to provide desired reflective characteristics within camera module 14 and to produce primary and secondary images that can be used for depth mapping operations. In another illustrative embodiment, distance d4 may be adjusted in real time by a user (e.g., using input-output devices 24) or software running on electronic device 10. In this example, distance d4 may be changed based on known characteristics of camera module 14 (such as the focal length of lens 18, depth of field 36, the chief ray angle of light incident upon sensor 16, and/or the reflectivity of sensor 16 and/or layers 32 and 34, for example) as well as the specific scene for which depth information is desired (e.g., the location of the object for which depth information is desired, the brightness of the scene, the aperture setting being used to capture the image, etc.).

The primary light rays that form primary images 42, 52, and 62 and the secondary light rays that form secondary images 46, 56, and 66 in FIGS. 3, 5, and 7 may be light in the visible or infrared portions of the electromagnetic spectrum. In one illustrative example, the primary and secondary images may be visible light images. Although only a relatively small amount of light (e.g., 1%, 2.5%, 3%, 1%-5%, more than 5%, or other suitable values) from the primary rays may reflect off of sensor 16 as reflected rays, secondary image 56 may be visible in the image captured by sensor 16 when the primary and reflected rays are in the visible portion of the spectrum. In this scenario, it may be desirable to apply a filter (e.g., a software-based filter) to the image data including both the primary and secondary image data in order to remove the secondary image in order to prevent it from appearing as an undesirable artifact when the image is viewed by a user.

In another illustrative example, the primary and secondary images may be infrared light images. Accordingly, it may be desirable for infrared cut-off filter 32 to pass more infrared light (e.g., 2% of infrared light, 10% of infrared light, 50% of infrared light, or other suitable percentages of the infrared light that is incident upon filter 32) such that more infrared light is available to form the primary and secondary images that are used to determine the depth of objects in the scene. The amount of infrared light that infrared cut-off filter 32 passes or blocks may be selected during the design and/or manufacturing of camera module 14, or may be adjusted by a user. If desired, infrared cut-off filter 32 may be omitted entirely to allow infrared light to reach sensor 16. In arrangements in which infrared light is used for depth sensing operations, processing operations may be performed to separate the image data generated in response to infrared light from the image data generated in response to visible light in order to prevent the data generated in response to the infrared light from causing undesirable visual artifacts in the image. The infrared image data may then be used for depth sensing operations, while the visible image data is used to generate a digital image (e.g., for presentation to a user).

It may also be desirable that image sensor 16, infrared cut-off filter 32, and/or interface layer 34 reflect more light so that more light is available to form secondary images. In general, the reflectivity of image sensor 16 and infrared cut-off filter 32/interface layer 34 may be selected to have reflective properties that optimize or maximize the amount of reflected light that is incident upon sensor 16 for forming the secondary images. If desired, additional reflective layers having specific reflective properties may be positioned between lens 18 and image sensor 16 to adjust the reflection of the reflected light rays that form the secondary images.

Figure 9:
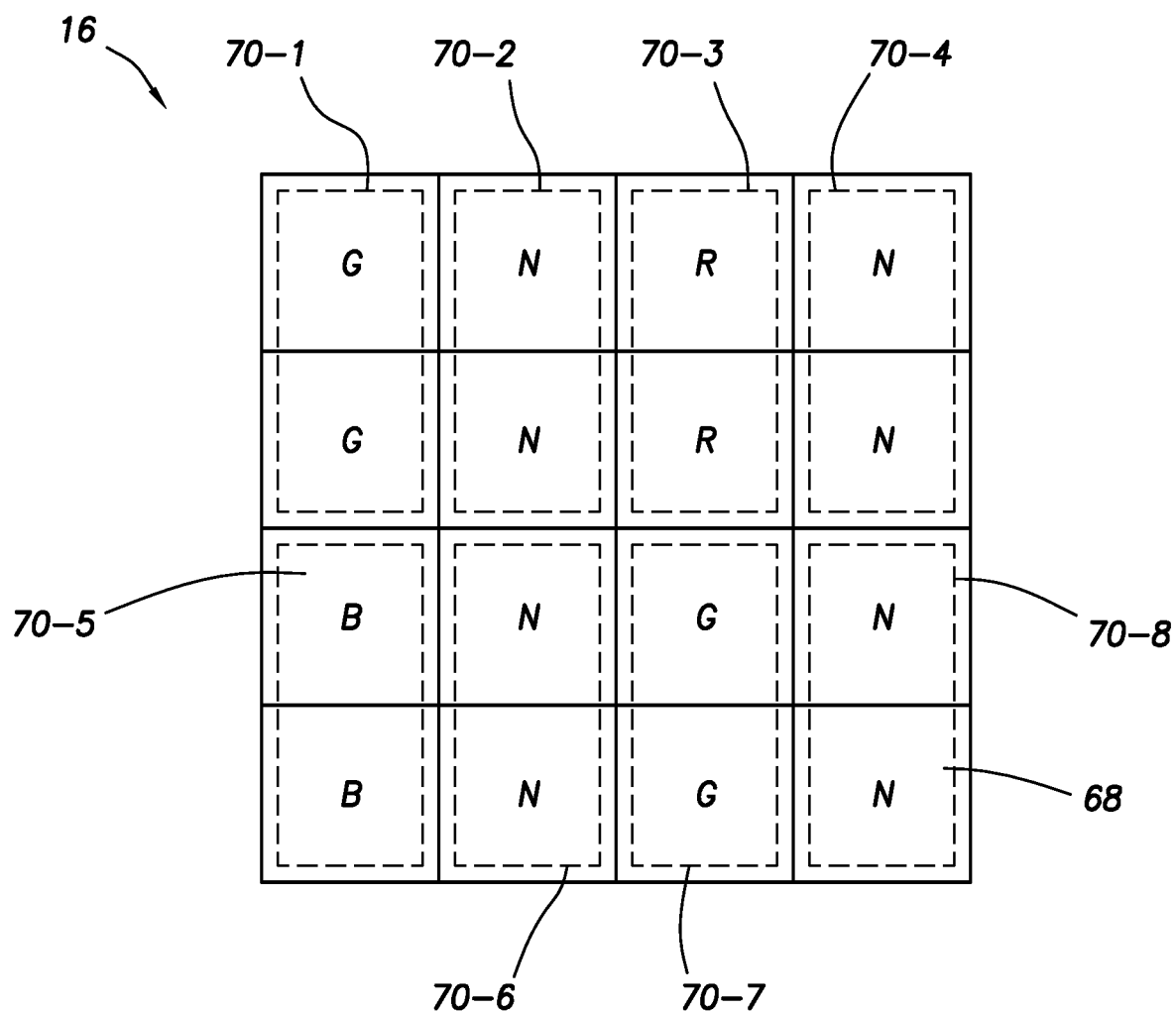
FIG. 9 is a diagram of an illustrative image sensor with a color filter pattern that may be used to provide the image sensor with both visible light and near-infrared sensitivity in accordance with an embodiment.

In arrangements in which infrared light is used for depth determination processing, it may be desirable for image sensor 16 to have both visible light and infrared or near-infrared (NIR) sensitivity. Accordingly, image sensor 16 may include both visible light and infrared color filter elements 68 over pixel array 21. FIG. 9 shows an illustrative image sensor with color filter patterns that may be used to provide the image sensor with both visible light and near-infrared sensitivity. Pixels with a green color filter element are labeled "G", pixels with a red color filter element are labeled "R", pixels with a blue color filter element are labeled "B", and pixels with an infrared or near-infrared color filter element are labeled "N." Pixels covered by a visible light (e.g., red, green, blue, etc.) color filter element may be referred to as visible light pixels and pixels covered by an infrared color filter element may be referred to as infrared light pixels. The pattern of FIG. 9 may include 4×4 unit cells that may be repeated across the array of pixels in the imaging sensor.

In the color filter pattern of FIG. 9, fifty percent of the pixels are infrared pixels. As shown, the pattern of FIG. 9 may include two pixels grouped together in adjacent rows and a single column (sometimes referred to as a 1×2 or 2×1 arrangement). These 1×2 groups of pixels may sometimes be referred to as sub-groups. For example, the pattern of FIG. 9 may include sub-groups 70-1 (with two green color filter elements), 70-2 (with two infrared color filter elements), 70-3 (with two red color filter elements), 70-4 (with two infrared color filter elements), 70-5 (with two blue color filter elements), 70-6 (with two infrared color filter elements), 70-7 (with two green color filter elements), and 70-8 (with two infrared color filter elements). The sub-groups may further form groups of pixels (and color filter elements). For example, sub-group 70-1 and sub-group 70-2 may form a first group, sub-group 70-3 and sub-group 70-4 may form a second group, sub-group 70-5 and sub-group 70-6 may form a third group, and sub-group 70-7 and sub-group 70-8 may form a fourth group. In other words, each group of color filter elements may be a quadrant of the 4×4 unit cell. If desired, each quadrant of the 4×4 unit cell may include a sub-group of infrared color filter elements and a sub-group of visible light (e.g., red, green, or blue) color filter elements.

When infrared color filter elements are provided over the pixels in image sensor 16, the amount of infrared light that reaches the pixels of sensor 16 (and therefore the amount of infrared light available for forming the primary and secondary images) may be increased relative to an arrangement in which only visible light color filters are provided. In one suitable arrangement, infrared color filter elements may simply allow infrared light to pass (e.g., primary rays of infrared light or reflected rays of infrared light) and reach sensor 16. In another suitable arrangement, the visible light color filters may be configured to reflect infrared light back away from the sensor. After being redirected off of infrared cut-off filter 32, for example, the reflected infrared light may pass through one of the infrared color filters to reach sensor 16. While the arrangement of visible and infrared color filter elements in FIG. 9 represents one possible color filter layout, it is merely illustrative. In general, any suitable arrangement of visible color filter elements and infrared color filter elements may be used to modulate the passage of infrared light to the pixels of sensor 16.

Figure 10:
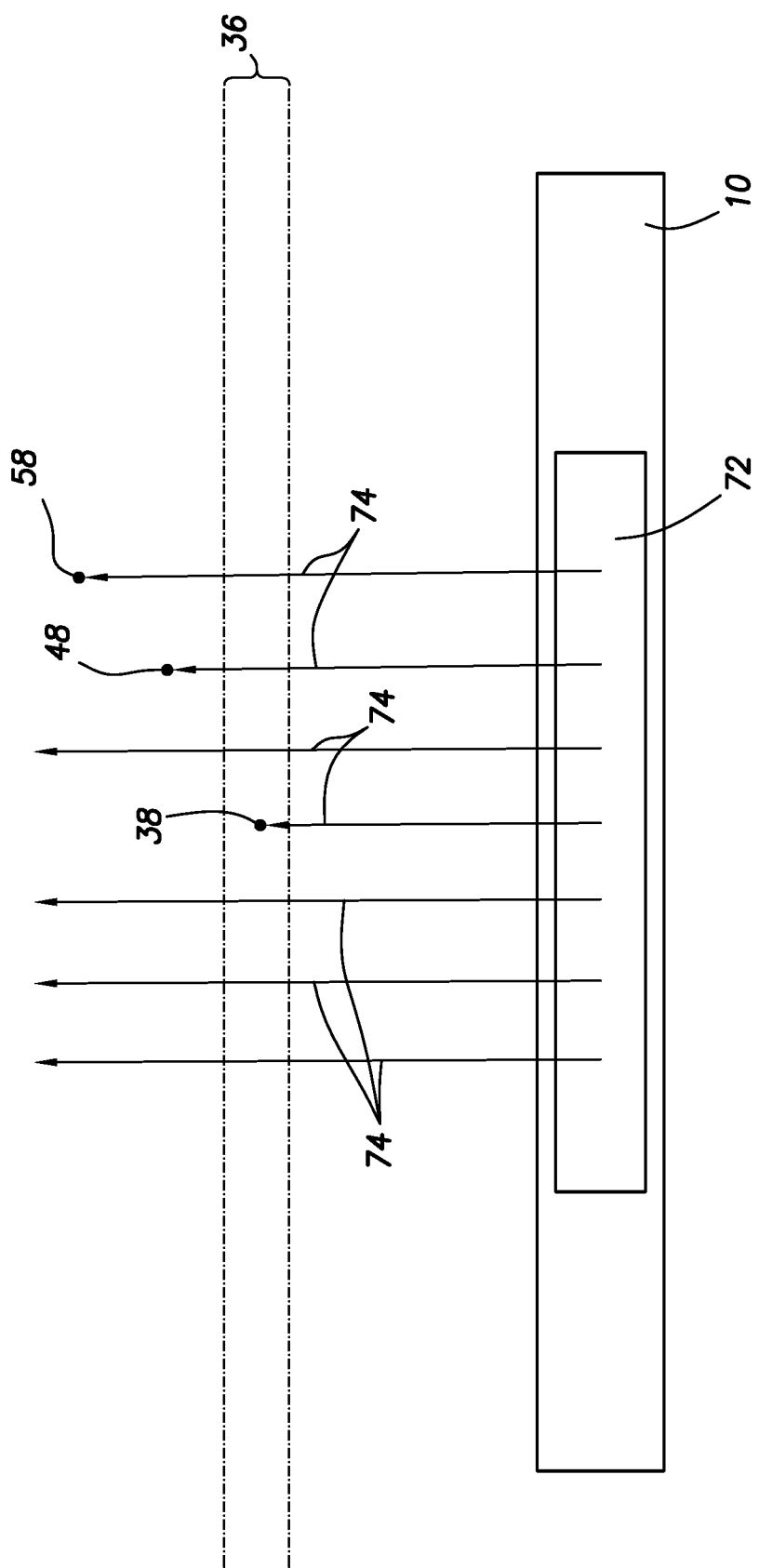
FIG. 10 is diagram of an illustrative electronic device that includes a light source for illuminating a scene in accordance with an embodiment.

In some scenarios, it may be desirable to use a controllable light source to illuminate a scene for which depth information is to be determined. In the illustrative example of FIG. 10, electronic device 10 includes light source 72 that emits light 74 into a scene in which objects 38, 48, and 58 (e.g., the objects from FIGS. 3, 5, and 7) are located. Light source 72 may be a light source that produces collimated light (sometimes referred to herein as a collimated light source), may emit light that scans across the scene using one or more discrete beams of light (sometimes referred to herein as a scanning light source), may be both a scanning and a collimated light source (sometimes referred to herein as a scanning collimated light source), may use an array of light sources to illuminate the scene with a corresponding array of dots, may be a pulsed light source that emits light at periodic intervals, or may use combinations of these types of light sources to illuminate the scene. If desired, light source 72 may only emit light of a specific or specific range of wavelengths (e.g., may only emit infrared light at 850 nm, may emit light across the infrared spectrum between 750 nm and 1000 nm, may emit visible light, etc.) that are used to illuminate the scene.

The characteristics of light source 72 may be known by or communicated to electronic device 10 for use during depth determination operations. For example, the known scanning pattern or the projection pattern of light source 72 may be utilized by electronic device in combination with other known characteristics of camera module 14 (e.g., focal length, aperture size, etc.) to determine the depth of an object in the illuminated scene. For example, collimated light from light source 72 may be expected to reflect off of objects differently based on their distance from sensor 16. Information regarding these types of predetermined characteristics of the light reaching sensor 16 may be utilized to determine expected paths for primary rays and reflected rays for objects at given depths and may help make depth detection operations more accurate.

In examples in which light source 72 emits light of a specific wavelength(s), depth sensing operations may be performed using only light of the specific wavelength that reflects off of the objects in the scene and reaches image sensor 16. By only monitoring specific wavelengths (as opposed to monitoring the entire visible spectrum or the entire infrared spectrum, for example) for depth sensing operations, identifying the primary and secondary images, their relative locations on the sensor, and their relative degrees of focus may be made easier. This, of course, is merely illustrative. Depth sensing operations may be performed using combinations of light from light source 72 in one or more wavelengths, combinations of ambient light from the environment and light from light source 72, or light from other suitable sources that reaches sensor 16. In some scenarios, bright portions of a scene (e.g., automobile headlights, lamps, highly reflective objects, etc.) may be particularly good portions of a scene on which to perform depth sensing operations. Because a relatively large amount of light from these sources reaches sensor 16, the amount of reflected light for forming a secondary image may be greater than for normal or dim portions of the scene.

Figure 11:
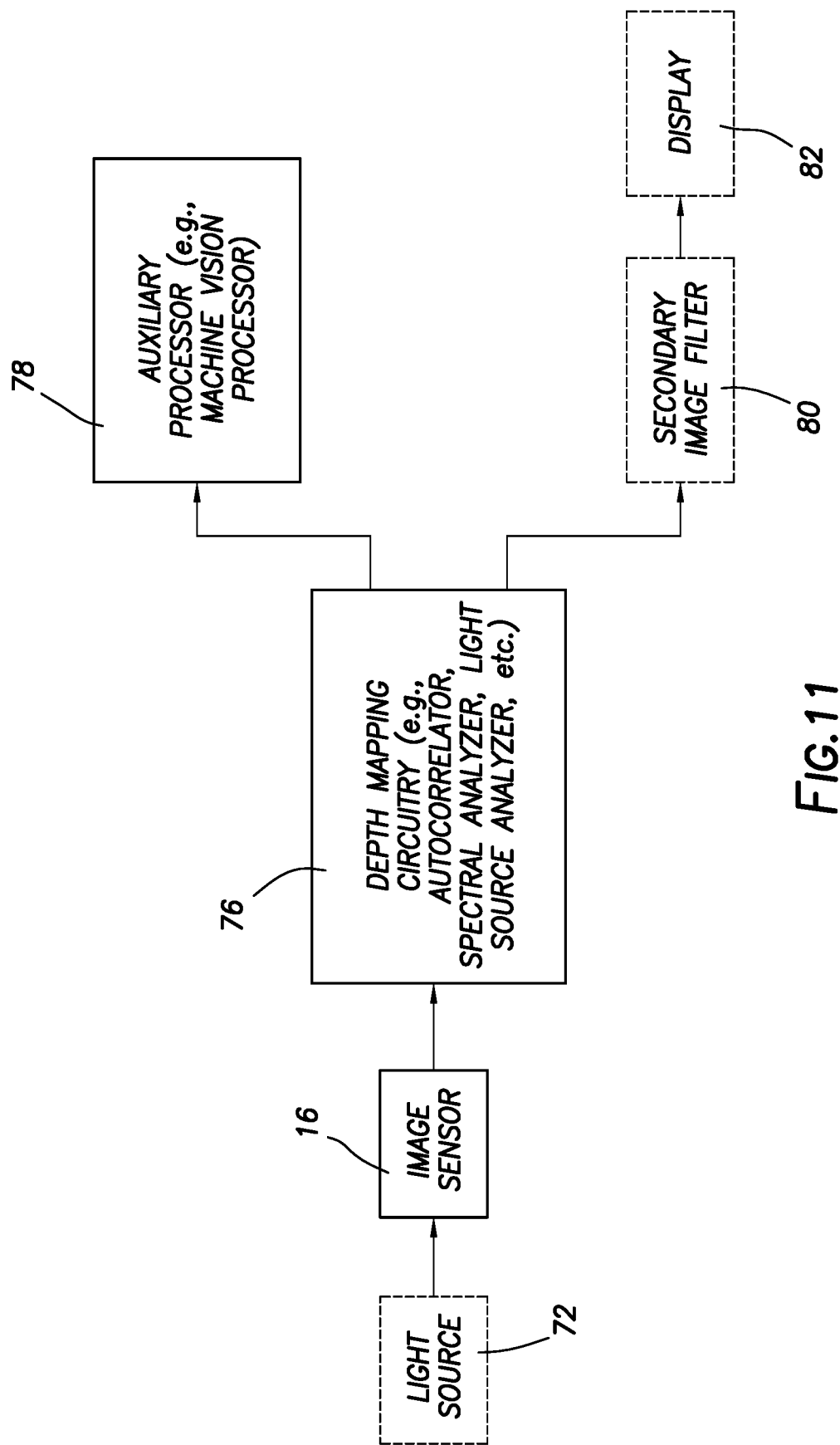
FIG. 11 is a block diagram showing illustrative components that may be used in performing depth mapping operations in accordance with an embodiment.

A block diagram of illustrative components of electronic device 10 that may be used in performing depth sensing operations is shown in FIG. 11. As shown in FIG. 11, depth sensing operations may begin with light source 72 emitting light into a scene for which depth information is desired (as described above in connection with FIG. 10). This, however, is optional. Light source 72 need not be used to illuminate the scene. Environmental light that reflects off of objects in the scene or light that is emitted by the objects in the scene themselves (e.g., automobile headlights, lamps, etc.) and that reaches image sensor 16 may be used to perform depth sensing operations, as described above in connection with FIGS. 3-8.

Regardless of the source, light from the scene reaches image sensor 16 as primary light rays that are directly incident upon image sensor 16 and are detected by the pixels, and as secondary light rays that reflect off of internal structures within sensor 16 and are eventually detected by the pixels. The primary light rays and the secondary light rays form primary and secondary images on the sensor 16. The image data that is generated by the sensor 16 for the primary image may be referred to as primary image data, and the image data that is generated by the sensor 16 for the secondary image may be referred to as secondary image data.

In general, the primary image data and the secondary image data will simply be portions of the image data for entire image of the scene that was captured. For example, the primary image data may correspond to a given object in the scene, and the secondary image data may correspond to a limited portion of the light from the object in the scene that reflected off of internal structures in the sensor 16 to form the secondary image. Because whatever location on the sensor at which the secondary image is formed also receives other light from the scene that is directly incident upon that portion of the sensor, the secondary image data may be mixed in with (e.g., obscured by) other image data. In order for electronic device 10 to identify the primary and secondary images for comparison and depth determination operations, specialized image processing (e.g., specialized hardware and/or software) may be required.

Depth mapping circuitry 76 (which may be a part of image processing and data formatting circuitry 20, storage and processing circuitry 26, or a discrete component or group of components in imaging system 12 or host subsystems 22) may be used to identify the primary and secondary image data from the all of the image data collected by image sensor 16 and to determine depth information for objects in the scene based on the primary and secondary image data. For example, depth mapping circuitry may perform autocorrelation operations on the image data to detect the primary and secondary images (e.g., depth mapping circuitry 76 may include an autocorrelator), may perform spectral analysis on the image data to identify the primary and secondary images (e.g., depth mapping circuitry 76 may include a spectral analyzer), may use known information about light source 72 (e.g., wavelength, emission pattern, etc.) to identify the primary and secondary images (e.g., depth mapping circuitry 76 may include a light source analyzer), or may perform other types of analysis on the image data from image sensor 16 in order to identify the primary and secondary image data and determine depth information. Depth mapping circuitry 76 may be referred to herein as a depth determination engine, depth processor, distance mapping circuitry, or range-finding circuitry.

Depth mapping circuitry may also use known characteristics of camera module 14 (such as the focal length of lens 18, depth of field 36, the chief ray angle of light incident upon sensor 16, and/or the reflectivity of sensor 16 and/or layers 32 and 34, for example) as well as known information about the specific scene for which depth information is desired (e.g., the location of the object for which depth information is desired, the brightness of the scene, the aperture size being used to capture the image, etc.) to identify the primary and secondary images.

Once the primary and secondary image have been identified, depth mapping circuitry 76 may compare the primary and secondary image data to determine the depth of an object in the scene (e.g., the object from which the primary and secondary light rays originated). For example, depth mapping circuitry 76 may be able to analyze the primary and secondary image data to determine how out of focus the secondary image is relative to the primary image, the size of the primary image relative to the secondary image, and/or make other comparisons between the primary and secondary image data to determine the distance between the object and the image sensor 16. After processing the primary and secondary image data, depth mapping circuitry 76 may output depth information for one or more objects in the scene.

In one illustrative arrangement, depth mapping circuitry 76 may provide the depth information to an auxiliary processor 78 for further processing or use. For example, auxiliary processor 78 may be a machine vision processor that utilizes the depth information from depth mapping circuitry 76 to perform machine vision tasks (e.g., warning a driver of a vehicle when their vehicle is too close to an object, controlling an automated assembly step that requires controlling the depth at which a component is placed, etc.).

Alternatively or in addition to using depth information from depth mapping circuitry 76 for automated processing, it may be desirable to provide the image data from which the depth information was generated to a user for viewing. For example, the image data that includes the primary image data and secondary image data may include image data that is useful to a user of a backup camera in a vehicle, a viewer of images captured by a security camera, or other possible applications. Because the secondary image data is generated in response to light reflected within sensor 16, the secondary image may appear as an undesirable visual artifact to a viewer of an image that includes the secondary image data. This may be particularly true when the secondary image is a product of visible light. In order to provide an image that is free of visual artifacts while still using the secondary image data for depth mapping, the secondary image may be removed from the image after extracting the depth information.

As shown in FIG. 11, a secondary image filter 80 (e.g., a software-based image filter or other electronically-implemented image filter) may be applied to the image data to remove the secondary image. Because depth mapping circuitry 76 has already identified the secondary image data, secondary image filter 80 may simply remove the secondary image data while retaining the primary image data and the rest of the image data from the scene. If desired, however, secondary image filter 80 may filter out the secondary image based on the wavelength of the light that generated the secondary image, based on the lack of focus in the secondary image, or based on other characteristics of the secondary image.

After the secondary image data has been removed, the image of the scene (including the primary image and the rest of the image data not removed by secondary image filter 80) may be provided to a user on display 82. In this way, a single image captured by image sensor 16 may be used for both depth sensing and viewing by a user without presenting undesirable visual artifacts that may be detrimental to the viewing experience.

Figure 12:
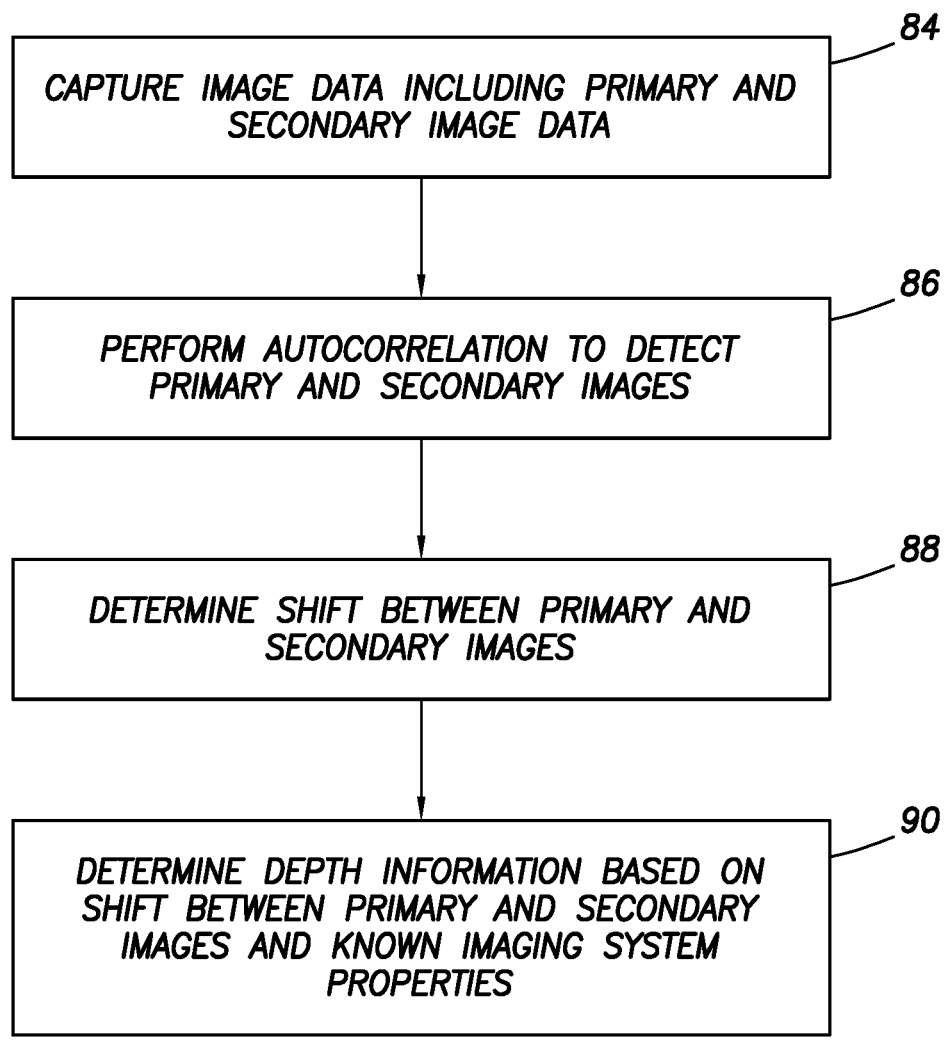
FIG. 12 is a flow chart of illustrative steps that may be taken to determine depth information for a scene using autocorrelation in accordance with an embodiment.

An illustrative flow chart of steps that may be performed in determining depth information using autocorrelation is shown in FIG. 12.

At step 84, image data (e.g., an image of a scene) is captured by image sensor 16. The image data may include primary image data generated in response to light from an object in the scene, secondary image data generated in response to reflected light from the object, and other image data generated in response to light from the rest of the scene (e.g., from parts of the scene other than the object).

At step 86, depth mapping circuitry 76 may analyze the image data generated at step 84 for the presence of autocorrelation between different parts of the image data. In general, autocorrelation detection operations serve to detect portions of the image data that are correlated with each other (i.e., have similar characteristics). In the illustrative examples described above in connection with FIGS. 3-8, for example, depth mapping circuitry may perform autocorrelation detection operations on portions of the image that include the primary image and the secondary image. Because the primary image is generated in response to light from an object that is directly incident upon the image sensor, and the secondary image is generated in response to a reflection of that very same light, the primary and secondary images will have similar characteristics (e.g., wavelength distribution, the shapes and sizes of specific portions of the images, etc.). In other words, the primary image data and the secondary image data will be autocorrelated. Upon determining that two portions of the image data are autocorrelated, the depth mapping circuitry may identify them as a primary image and secondary image pair. The depth mapping circuitry may then go on to use the image data specific to the primary image and the secondary image to perform depth mapping operations.

At step 88, depth mapping circuitry 76 may compare the primary image data to the secondary image data to determine information regarding a shift of the secondary image relative to the primary image. In one illustrative example, depth mapping circuitry 76 may use the level of autocorrelation between the primary image and the secondary image as one measure of the shift. In general, the more autocorrelated the primary and secondary image are, the lower the degree of shift between them, and the less autocorrelated the primary and secondary image are, the higher the degree of shift between them. If desired, depth mapping circuitry 76 may determine how much the secondary image is shifted relative to the first image (as measured in pixels or a sub-pixel unit, for example), may determine the direction of the shift, may determine how out-of-focus the primary and secondary images are (e.g., determine the relative blurriness of the primary and secondary images), or may compare the primary and secondary images in other ways. Comparing the primary and secondary image data may provide information regarding the depth of the object that was captured as the primary and secondary images.

At step 90, depth mapping circuitry 76 may determine depth information for the object based on the shift information determined at step 88, other known characteristics of camera module 14, and the individual circumstances under which the image was captured. The shift information may include information of the type described above in connection with step 88. Known characteristics of camera module 14 and the circumstances of the image capture may include the focal length of lens 18, depth of field 36, the chief ray angle of light incident upon sensor 16, the reflectivity of sensor 16 and/or layers 32 and 34, the length of distance d4 between the sensor 16 and the reflective structures, the location of the object for which depth information is desired, the brightness of the scene, and the aperture size used to capture the image, among other factors. Based on this information, depth mapping circuitry may calculate or estimate a distance (e.g., d1, d2, and/or d3 in FIGS. 3, 5, and 7) between image sensor 16 (or another component of camera module 14) and the object. The distance may be measured in any suitable unit of length (e.g., millimeters, centimeters, meters, inches, feet, yards, etc.). In this way, depth mapping operations may provide useful information regarding the locations of objects in a scene.

Figure 13:
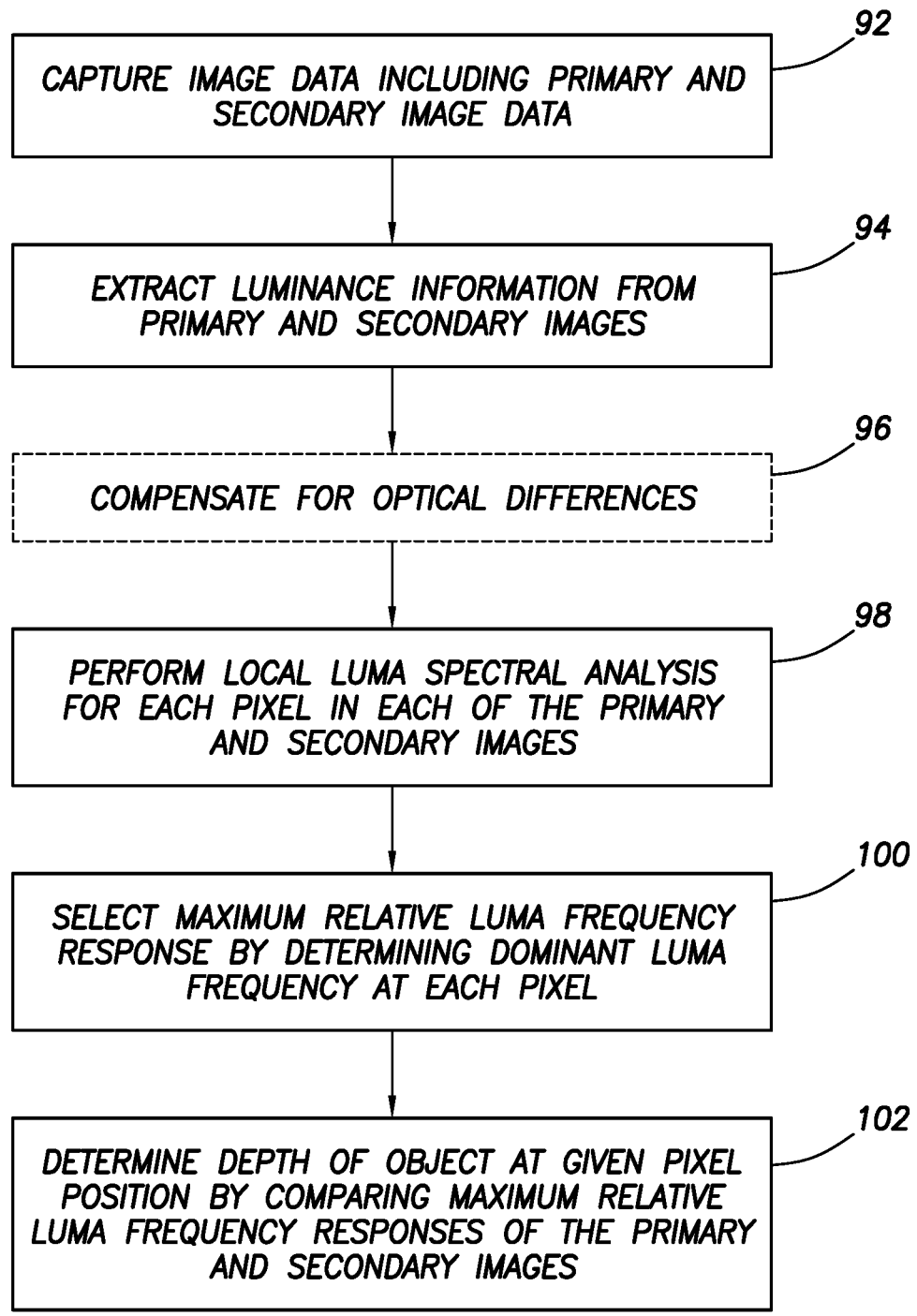
FIG. 13 is a flow chart of illustrative steps that may be taken to determine depth information for a scene using spectral analysis in accordance with an embodiment.

An illustrative flow chart of steps that may be performed in determining depth information using spectral analysis is shown in FIG. 13.

At step 92, image data (e.g., an image of a scene) is captured by image sensor 16. The image data may include primary image data generated in response to light from an object in the scene, secondary image data generated in response to reflected light from the object, and other image data generated in response to light from the rest of the scene (e.g., from parts of the scene other than the object).

At step 94, depth mapping circuitry 76 may extract luminance information from the primary and secondary images. Luminance information may include individual output values for pixels corresponding to the locations of the primary image and the secondary image on sensor 16.

At optional step 96, optical differences based on the width d4 of the gap between the image sensor 16 and the at least partially reflective structures 32 and/or 34 may be compensated for. For example, a large width for d4 may cause the primary and secondary images to be highly distorted and/or blurry. In situations in which the primary image, the secondary image, or both will eventually be displayed to a user, it may be desirable to compensate for the distortion caused by the large width d4. In one illustrative example, this may be accomplished by performing calibration operations based on known characteristics of lens 18. Because compensation of this type may only be necessary with a large gap width d4 and/or when the image is going to be displayed to a user, step 96 is optional and may be omitted, if desired.

At step 98, depth mapping circuitry 76 may perform local luma spectral analysis for each pixel in the primary image and each pixel in the secondary image. Local luma spectral analysis may be performed by depth mapping circuitry 76 or other hardware in electronic device 10 by applying multi-resolution Gaussian low-pass filters to the luma output of each pixel, and observing the resulting responses at each pixel.

At step 100, depth mapping circuitry 76 may determine a single dominant luma frequency at each pixel by selecting the maximum relative luma frequency response at each pixel. In some scenarios (e.g., when calculating precise depth measurements), it may be necessary to interpolate the relative luma frequency responses to determine a fractional maximum relative luma frequency response.

At step 102, depth mapping circuitry 76 may determine the depth of an object at a given pixel position by comparing the ratios of the (fractional) maximum relative luma frequency responses of the primary and secondary images. The ratios between the maximum relative luma frequency responses of the primary and secondary images at a given pixel position determine the depth of the object at the given pixel position.

In general, using autocorrelation operations as described above in connection with FIG. 12 may be preferable for determining depth information when camera module 14 has a relatively deep depth of field 36. Using spectral analysis operations as described above in connection with FIG. 13 may be preferable for determining depth information when camera module 14 has a relatively shallow depth of field 36. This, however, is merely illustrative. If desired, the operations of FIGS. 12 and 13 may be used to perform depth mapping operations for images captured using a camera module 14 with any depth of field.

The foregoing is merely illustrative of the principles of this invention and various modifications can be made by those skilled in the art. The foregoing embodiments may be implemented individually or in any combination.

What is claimed is:

1. An imaging system comprising:
   a lens;
   an image sensor comprising an array of pixels that generate image data;
   an at least partially reflective intermediate layer interposed between the lens and the image sensor;
   an infrared cut-off filter interposed between the intermediate layer and the lens, wherein light from an object passes through the lens, the infrared cut-off filter, and the intermediate layer to reach the image sensor, wherein a first portion of the light is captured by the array of pixels to generate a primary image, and wherein a second portion of the light reflects off of the image sensor towards the intermediate layer, reflects off of the intermediate layer back toward the image sensor, and is captured by the array of pixels to generate a secondary image that is different than the primary image; and
   depth mapping circuitry that detects the primary image and the secondary image and that compares the primary image to the secondary image to determine a distance between the imaging system and the object, wherein the first and second portions of the light are visible light.

2. The imaging system defined in claim 1, wherein the imaging system has a depth of field, wherein the object is outside of the depth of field of the imaging system, and wherein the primary image is a first blur spot of a first size.

3. The imaging system defined in claim 2, wherein the secondary image is a second blur spot of a second size that is greater than the first size, and wherein the depth mapping circuitry determines the distance between the imaging system and the object based on the first size of the first blur spot and the second size of the second blur spot.

4. The imaging system defined in claim 1, wherein the depth mapping circuitry applies autocorrelation detection operations to the image data to detect the primary image and the secondary image and to determine the distance between the imaging system and the object.

5. The imaging system defined in claim 1, wherein the depth mapping circuitry applies spectral analysis to the image data to detect the primary image and the secondary image and to determine the distance between the imaging system and the object.

6. The imaging system defined in claim 1, further comprising:
   processing circuitry that applies a filter to the image data to remove the secondary image from the image data after the depth mapping circuitry determines the distance between the imaging system and the object.

7. The imaging system defined in claim 6, wherein the processing circuitry displays the image data to a user after the secondary image has been removed.

8. The imaging system defined in claim 1, wherein a gap separates the intermediate layer and the image sensor, and wherein a width of the gap is adjustable.

9. An imaging system comprising:
   a lens;
   an image sensor that captures an image of a scene;

reflective layers interposed between the lens and the image sensor; and depth processing circuitry that determines depth information for the scene based on light that reflects off of the reflective layers and onto the image sensor, wherein the image sensor comprises a color filter layer having visible light color filters and infrared color filters and wherein the light that reflects off of the reflective layers and onto the image sensor passes through the infrared color filters and is blocked by the visible light color filters.

10. The imaging system defined in claim 9, further comprising:

a light source that illuminates the scene, wherein the light that reflects off of the reflective layers and onto the image sensor is generated by the light source and is reflected off of an object in the scene that is illuminated by the light source.

11. The imaging system defined in claim 10, wherein the light source is a light source selected from the group consisting of: a scanning collimated light source and a pulsed light source.

12. The imaging system defined in claim 9, wherein the image sensor captures a primary image of an object in the scene from a primary light ray that is incident upon the image sensor, wherein a portion of the primary light ray reflects off of the image sensor as a secondary light ray, and wherein the secondary light ray is the light that reflects off of the reflective layers and onto the image sensor, wherein the image sensor captures a secondary image of the object in the scene from the light that reflects off of the reflective layers and onto the image sensor, and wherein the depth processing circuitry determines the depth information for the scene by determining a distance between the imaging system and the object based on the primary image and the secondary image.

13. A method of operating an imaging system comprising an image sensor, a reflective layer, and a depth determination engine, the method comprising:

with the image sensor, capturing image data for a scene, wherein the image data includes primary image data generated in response to light directly incident upon the image sensor and secondary image data generated in response to light that reflected off of the image sensor, off of the reflective layer, and back onto the image sensor;

with the depth determination engine, determining depth information for the scene by comparing the primary image data to the secondary image data; and with the depth determination engine, performing autocorrelation operations on the image data to identify the primary image data and the secondary image data and determine the depth information.

14. The method defined in claim 13, further comprising:

with the depth determination engine, performing spectral analysis operations on the image data to identify the primary image data and the secondary image data and determine the depth information.

15. The method defined in claim 13, further comprising:

filtering the image data to remove the secondary image data while retaining the primary image data; and displaying the filtered image data to a user.

16. The method defined in claim 13, further comprising:

providing the depth information for the scene to a machine vision processor.

* * * * *